United States Patent
Fanning et al.

(10) Patent No.: US 6,366,907 B1
(45) Date of Patent: Apr. 2, 2002

(54) REAL-TIME SEARCH ENGINE

(75) Inventors: Shawn Fanning, San Mateo, CA (US); John Fanning, Hull, MA (US); Edward Kessler, Los Gatos, CA (US)

(73) Assignee: Napster, Inc., Redwood, CA (US)

( * ) Notice: Subject to any disclaimer, the term of this patent is extended or adjusted under 35 U.S.C. 154(b) by 0 days.

(21) Appl. No.: 09/464,653

(22) Filed: Dec. 15, 1999

(51) Int. Cl.⁷ .............................. G06F 17/30
(52) U.S. Cl. ............. 707/3; 707/10; 709/215; 709/217
(58) Field of Search .............. 707/3, 10; 709/215, 709/217

(56) References Cited

U.S. PATENT DOCUMENTS

| | | | |
|---|---|---|---|
| 4,506,387 A | 3/1985 | Walter | 455/612 |
| 4,616,263 A | 10/1986 | Eichelberger | 358/185 |
| 4,648,123 A | 3/1987 | Schrock | 455/67 |
| 4,745,559 A | 5/1988 | Willis et al. | 364/514 |
| 4,766,581 A | 8/1988 | Korn et al. | 369/30 |
| 4,769,833 A | 9/1988 | Farleigh et al. | 379/105 |
| 4,844,679 A | 7/1989 | Teranishi | 414/331 |
| 4,867,628 A | 9/1989 | Ammon et al. | 414/273 |
| 4,891,720 A | 1/1990 | Grant et al. | 360/92 |
| 4,893,307 A | 1/1990 | McKay et al. | 370/94.1 |
| 4,961,139 A | 10/1990 | Hong et al. | 364/200 |
| 5,014,125 A | 5/1991 | Pocock et al. | 358/86 |
| 5,093,718 A | 3/1992 | Hoarty et al. | 358/84 |
| 5,101,488 A | 3/1992 | Rosenthal et al. | 395/425 |
| 5,132,789 A | 7/1992 | Ammon et al. | 358/86 |
| 5,133,065 A | 7/1992 | Cheffetz et al. | 395/575 |
| 5,133,079 A | 7/1992 | Ballantyne et al. | 455/4.1 |
| 5,192,999 A | 3/1993 | Graczyk et al. | 358/85 |
| 5,220,420 A | 6/1993 | Hoarty et al. | 358/86 |
| 5,224,205 A | 6/1993 | Dinkin et al. | 395/200 |
| 5,233,346 A | 8/1993 | Minerd et al. | 340/825.52 |
| 5,357,276 A | 10/1994 | Banker et al. | 348/7 |
| 5,392,400 A | 2/1995 | Berkowitz et al. | 395/200 |
| 5,410,343 A | 4/1995 | Coddington et al. | 348/7 |
| 5,497,502 A | 3/1996 | Castille | 455/5.1 |
| 5,528,281 A | 6/1996 | Grady et al. | 348/7 |
| 5,544,352 A | 8/1996 | Egger | 395/600 |
| 5,570,126 A | 10/1996 | Blahut et al. | 348/7 |
| 5,608,447 A | 3/1997 | Farry et al. | 348/7 |
| 5,617,539 A | 4/1997 | Ludwig et al. | 395/200.02 |
| 5,625,404 A | 4/1997 | Grady et al. | 348/7 |
| 5,635,979 A | 6/1997 | Kostreski et al. | 348/13 |

(List continued on next page.)

OTHER PUBLICATIONS

"Gnutella News—Gnutella News and Information," Aug. 1, 2000, www.gnutella.com.
"Gnotella Help Page," Aug. 10, 2000, www.gnotella.nerd-herd.net/help.html.
SourceForge, "The Free Network Project Hom," Aug. 10, 2000, www.freenet.sourceforge.net/.
Bob Schmidt, "nguCache—Connecting the world," Aug. 10, 2000, www.gnucache.backroomwarehouse.com/.

*Primary Examiner*—Frantz Coby
(74) *Attorney, Agent, or Firm*—Haverstock & Owens LLP

(57) ABSTRACT

Disclosed is described a method for creating a real-time search engine over the Internet which provides a search response containing data object descriptions and server descriptions of data objects that are currently available for transfer from a provider server directly to a recipient client in response to a recipient client search request. The method comprises the provider server connecting to a Real-time search engine through the Internet, the provider server providing the Real-time search engine with data object descriptions of data objects residing on the provider server, and the Real-time search engine indexing data object descriptions associated with the data object of the provider server, wherein the data object descriptions provided by the provider server are purged from the Real-time search engine when the provider server is disconnected from the Real-time search engine.

23 Claims, 4 Drawing Sheets

U.S. PATENT DOCUMENTS

| | | | | |
|---|---|---|---|---|
| 5,701,469 A | | 12/1997 | Brandli et al. | 395/613 |
| 5,712,906 A | | 1/1998 | Gradys et al. | 379/93.17 |
| 5,715,395 A | | 2/1998 | Brabson et al. | 395/200.13 |
| 5,734,961 A | | 3/1998 | Castille | 455/5.1 |
| 5,737,532 A | | 4/1998 | DeLair et al. | 395/200.49 |
| 5,754,784 A | | 5/1998 | Garland et al. | 395/200.49 |
| 5,754,938 A | | 5/1998 | Herz et al. | 455/4.2 |
| 5,764,982 A | | 6/1998 | Madduri | 395/680 |
| 5,778,185 A | | 7/1998 | Gregerson et al. | 395/200.56 |
| 5,778,363 A | | 7/1998 | Light | 707/5 |
| 5,778,368 A | * | 7/1998 | Hogan et al. | 707/10 |
| 5,784,562 A | * | 7/1998 | Diener | 709/217 |
| 5,794,249 A | | 8/1998 | Orsolini et al. | 707/104 |
| 5,796,393 A | | 8/1998 | MacNaughton et al. | 345/329 |
| 5,806,065 A | | 9/1998 | Lomet | 707/8 |
| 5,845,070 A | * | 12/1998 | Ikudome | 709/215 |
| 5,848,410 A | | 12/1998 | Walls et al. | 707/4 |
| 5,870,744 A | | 2/1999 | Sprague | 707/9 |
| 5,877,755 A | | 3/1999 | Hellhake | 345/327 |
| 5,878,410 A | | 3/1999 | Zibikowski et al. | 707/2 |
| 5,884,035 A | | 3/1999 | Butman et al. | 395/200.48 |
| 5,903,892 A | | 5/1999 | Hoffert et al. | 707/10 |
| 5,920,854 A | * | 7/1999 | Kirsch et al. | 707/3 |
| 5,926,811 A | | 7/1999 | Miller et al. | 707/5 |
| 5,931,907 A | | 8/1999 | Davies et al. | 709/218 |
| 5,956,711 A | | 9/1999 | Sullivan et al. | 707/6 |
| 5,960,194 A | | 9/1999 | Choy et al. | 395/613 |
| 5,960,404 A | * | 9/1999 | Chaar et al. | 705/8 |
| 5,963,957 A | | 10/1999 | Hoffberg | 707/104 |
| 5,966,139 A | | 10/1999 | Anupam et al. | 345/440 |
| 5,966,703 A | | 10/1999 | Burrows | 707/2 |
| 5,974,409 A | | 10/1999 | Sanu et al. | 707/3 |
| 5,974,412 A | | 10/1999 | Hazlehurst et al. | 707/3 |
| 5,983,218 A | | 11/1999 | Syeda-Mahmood | 707/3 |
| 5,987,376 A | | 11/1999 | Olson et al. | 701/201 |
| 5,987,454 A | | 11/1999 | Hobbs | 707/4 |
| 5,987,464 A | | 11/1999 | Scheider | 707/10 |
| 6,003,041 A | | 12/1999 | Wugofski | 707/104 |
| 6,005,860 A | | 12/1999 | Anderson et al. | 370/352 |
| 6,006,225 A | * | 12/1999 | Bowman et al. | 707/5 |
| 6,012,096 A | | 1/2000 | Link et al. | 709/233 |
| 6,026,409 A | * | 2/2000 | Blumenthal | 707/104 |
| 6,029,195 A | | 2/2000 | Herz | 709/219 |
| 6,032,129 A | | 2/2000 | Greef et al. | 705/27 |
| 6,044,374 A | | 3/2000 | Nesamoney et al. | 707/10 |
| 6,044,376 A | | 3/2000 | Kurtzman, II | 707/102 |
| 6,052,784 A | | 4/2000 | Day | 713/201 |
| 6,055,513 A | | 4/2000 | Katz et al. | 705/26 |
| 6,055,568 A | | 4/2000 | Adams | 709/221 |
| 6,064,980 A | | 5/2000 | Jacobi et al. | 705/26 |
| 6,070,158 A | * | 5/2000 | Kirsch et al. | 707/3 |
| 6,076,108 A | * | 6/2000 | Courts et al. | 709/227 |
| 6,078,892 A | | 6/2000 | Anderson et al. | 705/10 |
| 6,078,913 A | * | 6/2000 | Aoki et al. | 707/2 |
| 6,085,223 A | * | 7/2000 | Carino, Jr. et al. | 709/203 |
| 6,092,074 A | * | 7/2000 | Rodkin et al. | 707/102 |
| 6,094,676 A | | 7/2000 | Gray et al. | 709/217 |
| RE36,840 E | | 8/2000 | Mihalisin et al. | 345/140 |
| 6,128,599 A | | 10/2000 | Walker et al. | 705/14 |
| 6,128,647 A | | 10/2000 | Haury | 709/207 |
| 6,144,944 A | | 11/2000 | Kurtzman, II et al. | 705/14 |
| 6,154,739 A | | 11/2000 | Wrobed | 707/6 |
| 6,169,989 B1 | | 1/2001 | Eichstaedt et al. | 707/100 |
| 6,175,829 B1 | | 1/2001 | Li et al. | 707/3 |
| 6,182,050 B1 | | 1/2001 | Ballard | 705/14 |
| 6,189,008 B1 | | 2/2001 | Easty et al. | 707/10 |
| 6,192,372 B1 | | 2/2001 | Yamaura et al. | 707/104 |
| 6,212,527 B1 | | 4/2001 | Gustman | 707/102 |

\* cited by examiner

REAL-TIME SEARCH ENGINE

BACKGROUND

Search engines as they currently exist on the Internet are used by people all over the world to find and download data objects of interest that reside on servers. Typically, these search engines periodically examine many servers on the Internet to see what data objects each server contains. Thereafter, the search engine constructs an index of each server's contents, and links the contents to that server's location.

The construction of the index is a time consuming task, and because of the relative cost involved to the servers and the search engine, it cannot be done very often. The timeliness of the information created by the search engine is sacrificed in order to reduce the burden on the index builder of the search engines and the servers that contain the data being searched.

This means that the search engine index is quickly out of date. For some types of data objects, this matters very little, since the data objects are created and modified relatively slowly. However, for data objects that are created and removed relatively often, the search engine indices are impractical, and for data objects that are added and removed daily, the standard search engines are practically useless. In addition, the current paradigm assumes a relatively static server environment, but in an environment where servers come up and go down relatively frequently and data objects are added and deleted hourly or more frequently, the standard search engine methodology is not useful at all.

Thus, it can be seen that there is a need for an Internet search engine that maintains an up-to-date index of data content residing on servers that are currently connected to the Internet.

There is a further need for a real-time search engine that significantly reduces the cost of constructing a search engine index using methods employed by the prior art.

SUMMARY

The present invention satisfies these needs by providing a method for creating a real-time search engine over the Internet that provides a search response containing data object descriptions and server descriptions 34 of data objects that are currently available for transfer from a provider server directly to a recipient client in response to a recipient client search request. This method comprises the provider server connecting to a real-time search engine through the Internet, the provider server providing the real-time search engine with data object descriptions of data objects residing on the provider server, and the real-time search engine indexing data object descriptions associated with the data object of the provider server, wherein the data object descriptions provided by the provider server are purged from the real-time search engine when the provider server is disconnected from the real-time search engine. The method further comprises the provider server automatically, in real-time, providing the real-time search engine with data object descriptions of data objects that are added to the provider server.

The method preferably further comprises the provider server automatically, in real-time, notifying the real-time search engine of data objects that are removed from the provider server, wherein the real-time search engine then purges the data object descriptions.

The data object descriptions comprise any of the following: a title of the data object, the size of the data object, the type of data object, any text associated with the data object, the creator of the data object, the quality rating of the data object, and the provider server on which the data object resides. The server description 34 comprises any of the following: the server Internet Protocol address, the number of simultaneous connections allowed by the server, the server's reliability, and the server's name.

Preferably, a client search command is used, wherein a recipient client searches the data object descriptions to find the best data object and selects the most optimal provider server that the data object resides on.

Furthermore, the recipient client search request further comprises a provider server limitation criteria, wherein the search engine prunes the search response of all provider servers that do not meet the server limitation criteria.

In a preferred embodiment, the provider server limitation criteria comprises a bandwidth limitation, wherein the search engine prunes the search response of provider servers that have a bandwidth capability that is below the bandwidth limitation.

Optionally, the real-time search engine purges from the search response provider servers that cannot accept additional recipient client download requests.

Also in a preferred embodiment, an automated search response sort by the client. The automated search response is sorted by the responsiveness value, wherein the responsiveness value is determined by measuring the amount of time an echo reply message takes to be returned by the provider server to the recipient client. Preferably, the provider server is pruned from the search response if the provider server did not respond to the recipient client's echo request within a specified period of time.

The data object is of the type selected from the group comprising: an audio data object, a text data object, a image data object, a video data object, and a software executable data object.

In a preferred embodiment, the real-time search engine further comprises the recipient selecting one of the provider servers in the search response, and then the recipient client downloading the data object from the selected provider server. Additionally, the recipient client simultaneously operates as a provider server to other recipient clients, making data objects that have been downloaded by the recipient client available to other recipient clients on the Internet.

DETAILED DESCRIPTION

The invention provides a method for creating a real-time search engine over the Internet that provides a search response containing data object descriptions and server descriptions of data objects that are currently available for transfer from a provider server directly to a recipient client in response to a recipient client search request. It is the essence of this invention that data object descriptions provided by the provider server are purged from the real-time search engine when the provider server is disconnected from the real-time search engine. This provides the recipient client with search results that include only those server sources that are currently available to provide and transfer any data to the recipient client.

Figure 1:
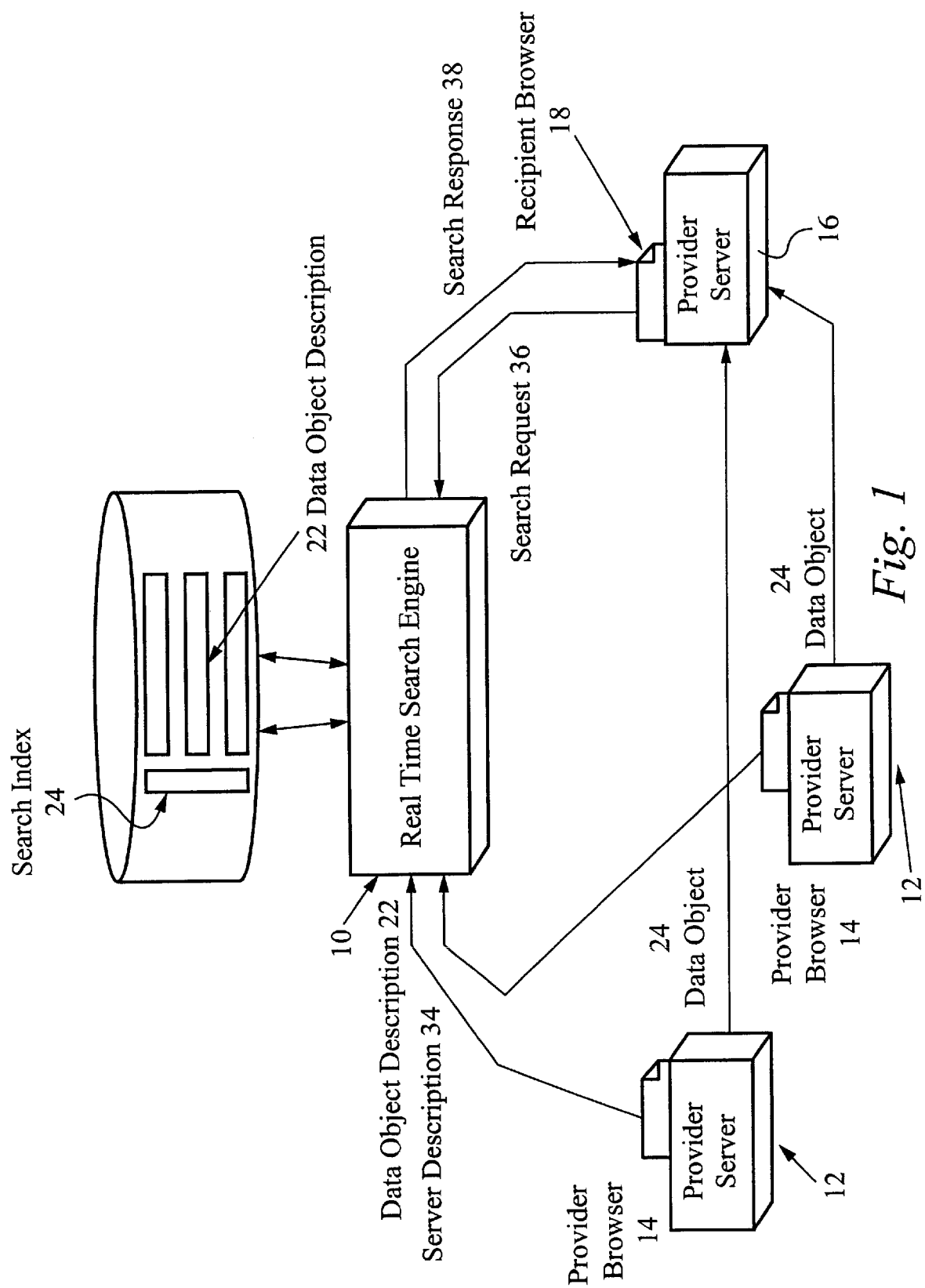
FIG. 1 is an overview diagram of a preferred embodiment of the system of the present invention.

Turning now to the figures, the overall configuration of the invention and its components are shown in FIG. 1. Essentially the components of a real-time search includes at least one recipient client 16 which connects to the real-time search engine 10 to locate a desired data object 24. At least one provider server 12 connects to the real-time search engine and provides one or more data object descriptions 22 to the real-time search engine. If the provider server 12 is disconnected from the real-time search engine, the data object descriptions 22 are purged from the real-time search engine, indicating that those data objects 24 are no longer available for download from the provider server to the recipient client 16.

Preferably, the provider server automatically, in real-time, provides the real-time search engine with data object descriptions 22 of data objects 24 that are added to the provider server 12.

Also, preferably, the provider server also automatically, in real-time, notifies the real-time search engine 10 of data objects 24 that are removed from the provider server 12, wherein the real-time search engine then purges the data object descriptions 22.

Recipient Client

Recipient clients connect to the real-time search engine 10 to find the best provider server that contains the particular data object that the recipient client 16 wishes to download from a provider server. The recipient client preferably uses a recipient browser 18 for communicating with the real-time search engine 10 and for making search requests from the real-time search engine. Examples of these browsers include the Nescape Communicator or the Microsoft Explorer or other custom interfaces.

Connections are typically software protocols that provide a method for transmitting information between entities that are connected; an example of such a protocol is TCP, which is the preferred connection protocol for the invention. However, other protocols that fulfill the same basic functionality as TCP (such as a UDP protocol with retransmits, and a disconnection timeout) will also suffice. These protocols are well known in the art.

In another embodiment, where the data object 24 is a text file, the search request contains any one of the following: a partial filename, keywords, author, the size of the file, the category, and the description of the text.

In one embodiment, where the data object 24 is an audio data file, the search request contains any one of the following: a partial filename, a bitrate (bps), a sample rate (Hz) of the data, the size of the file, the duration, the name of the author or artist, the song title, the genre, and the title of the album.

In another embodiment, where the data object 24 is an image or video file, the search request contains any one of the following: a partial filename, the amount and type of compression, the size of the file, the category, and the description of the image or video.

When a search response is returned to the recipient, the recipient browser 18 displays the results of the search request for the recipient to examine.

In a preferred embodiment, the recipient client 16 determines a response time of each of the provider servers returned in the search response. The response time is measured by the recipient client 16 sending an ICMP echo packet to each provider server, and measuring the amount of time it takes to receive a reply from the provider server. The recipient client browser 18 uses the response time to sort the data object descriptions 22, which then displays the data object descriptions of the provider servers in order of their response time.

In an embodiment, the recipient may choose a search parameter for the real-time search engine 10 to provide a search response 38 that includes only data object descriptions on provider servers that have a minimum data transfer bandwidth capability.

In another embodiment, the recipient directs the search engine to return a search response 38 containing only data object descriptions for provider servers that are not currently too busy to accept additional download requests.

In one embodiment, the provider server is not located behind a firewall. The recipient client 16 downloads a data object 24 from the provider server by connecting directly to the provider server, requesting a data object, and then storing the data object in the recipient's data object collection.

In one embodiment, an optimal provider server is automatically selected from among at least two provider servers that are able to supply a desired data object using a scoring mechanism. The scoring mechanism comprises the roundtrip response time from the recipient client to the provider server, the Internet connection line speed (data transfer speed) of the provider server, the size of the file, and the reliability of the provider server. The best score is usually from a provider server that has a high line speed and high provider server reliability. The provider server with the best score is preferably selected by the recipient client for download.

In another embodiment, in order to determine the best score, the recipient client or the provider server uploads to the real time search engine the actual transfer rate for each data object transfer which is used to calculate of the effective line speed of the provider server.

Provider Server

Each provider server contains a data object collection of data objects 24 that may be downloaded from the provider server. When the provider server is prepared to provide data objects to any requesting recipient client 16, the provider server connects to the realtime search engine, and uploads descriptions of each data object in the data object collection. The real-time search engine is updated immediately. The data object descriptions 22 comprise any of the following: a title of the data object, the size of the data object, the type of data object, any text associated with the data object, the creator of the data object, the quality rating of the data object, and the provider server on which the data object resides.

In the preferred embodiment, the connection between provider server and realtime search engine 10 is accomplished using the TCP protocol. Occasional messages are sent between provider server 12 and the real-time search engine to assert that the connection between the two is valid. If no message is received from the provider server for several minutes, the connection is closed and the connection to the provider server is broken.

In one embodiment, the provider server authenticates itself to the real-time search engine using a login process, immediately after connecting to the real-time search engine, by transmitting a login name and a password.

In another embodiment, a determination is made if the provider server 12 is protected by a firewall, and this determination is transmitted to the real-time search engine 10 during the initial login.

In yet another embodiment, when the provider server scans the data objects in the data object collection, each data object's type is ascertained by examining the extension on the filename (.mp3, .jpg, .mpg, .doc are a few examples). Files without extensions are ignored. Each file is validated as to the proper formatting of the data contained within. Data objects that fail validation do not have their descriptions uploaded to the real-time search engine.

When data objects are added to the provider server, the provider server transmits the new data object's description to the real-time search engine. Likewise, when a data object 24 is deleted, the provider server 12 notifies the real-time search engine of the deletion.

In one embodiment, during the login process the provider server only transmits the changes that were made in its data object collection since the last connection to the real-time search engine. Both the real-time search engine 10 and the provider server store a copy of the data object descriptions that have been uploaded to the real-time search engine, and all of the successfully acknowledged changes to those descriptions. In this way, the initial information transmitted from the provider server to the real-time search engine is minimized for large data object collections.

In the preferred embodiment, the data object collection is at least one directory on the provider server. The data object collection alternatively contains other directories that themselves contain other data objects or more directories.

In another embodiment, the data object collection is stored on a computer remote from the provider server 12, but is accessible by the provider server. A data object collection is optionally data objects in a database, files in a directory, data objects in memory, on CD-ROM, flash memory, etc.

In one embodiment, the provider server also contains a server description, which comprises its own data transfer line bandwidth to the Internet, and it uploads this server description during the initial connection to the real-time search engine.

In a preferred embodiment, both the provider server and recipient client 16 are located within the same executable image. Thus, whenever a recipient runs a recipient browser, he also simultaneously runs a provider server.

In one embodiment, data objects downloaded by the recipient client from other provider servers are immediately added to the data object collection, making these data objects instantly available to other recipient clients on the Internet. In this embodiment, the rapid spread of data objects throughout the network of provider servers and recipient clients is greatly facilitated.

In a preferred embodiment, a data object fingerprint is constructed by performing a checksum of the data object. Each data object is uniquely identifiable by the fingerprint of the data object's data.

In a preferred embodiment, if the provider server 12 is not behind a firewall, recipient clients connect directly to the provider server, and request that a chosen data object be transferred from the provider server and downloaded to the recipient client 16. If the provider server is behind a firewall, then the recipient client 16 asks the real-time search engine 10 to pass the download request to the provider server. When the provider server receives this download request, it then connects to the recipient client 16 and then the download occurs. If both the provider server 12 and the recipient client are protected by firewalls, a proxy server is used to facilitate the transfer. The recipient client informs the real-time search engine of the download request, the real-time search engine transmits the request to the provider server, the recipient client and the provider server both connect to the proxy server, which then allows data to flow and hence the download to occur between the recipient client and the provider server through the proxy server.

Real-Time Search Engine

Figure 2:
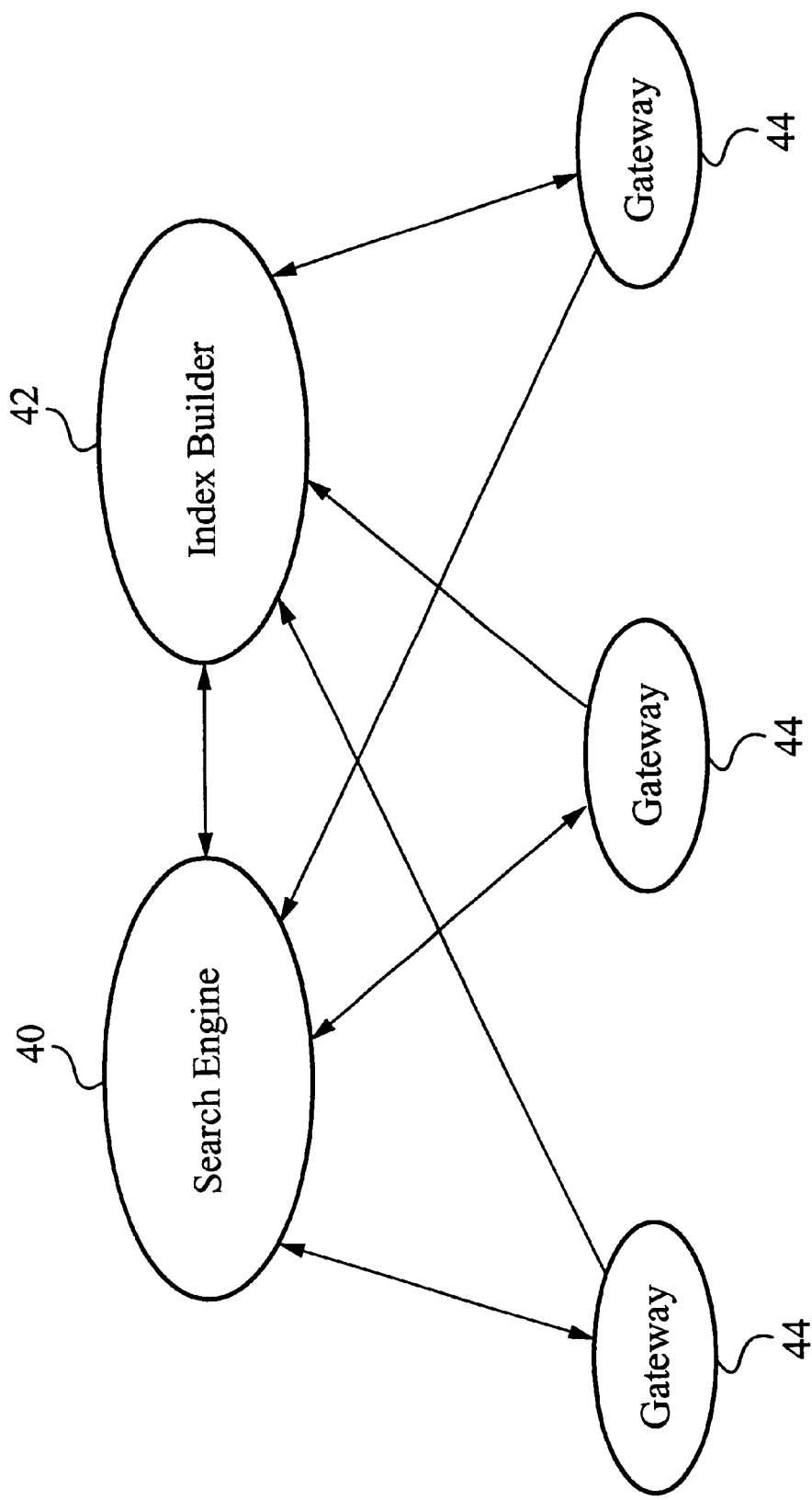
FIG. 2 is an overview diagram of a preferred embodiment of the real-time search engine with its search engine, index builder and gateway components.

As shown in FIG. 2, in a preferred embodiment, the real-time search engine has the following components: at least one search engine Gateway, at least one search engine, at least one search engine Index Builder, and a search engine Index.

Search Engine Gateway

In a preferred embodiment, each provider server that connects to the real-time search engine connects to the search engine gateway 44 component. When a provider server uploads information about the data objects it contains, the search engine gateway 44 takes this information and passes it to the search engine index builder 42, which uses it to update the search engine index. When a provider server disconnects, or is disconnected by a network error, or otherwise fails to communicate with the real-time search engine, the search engine gateway detects this, and informs the search engine index builder 42, which in turn removes the data object descriptions uploaded by that provider server 12 from the search engine index.

Alternatively, when a particular provider server is disconnected, the search engine index builder 42 does not actually remove the data object, but instead marks the data object descriptions as "Not Available." When that provider server re-connects, instead of transmitting the entire list of data object descriptions, it transmits only changes to its data object collection that may have occurred during the disconnected period. During searches, the search engine 40 ignores all data object descriptions that are marked as "Not Available."

In one embodiment, each recipient client 16 also connects to a search engine gateway. In this embodiment, each search engine gateway 44 connects in turn to a search engine 40. All search requests from recipient clients are transmitted to the search engine gateway, and the search engine gateway then transmits the search requests to the connected search engine. The search engine executes the search request, and transmits the search response 38 back to the search engine gateway, which in turn transmits the search response back to the originating Recipient client.

In another embodiment, the search engine gateway tracks data object downloads initiated by recipient clients. The recipient client transmits a request to download a particular data object from a provider server. If the download is successful, the recipient client 16 informs the search engine gateway 44 that the download was completed. Using this information, the search engine gateway tracks the reliability of the provider server, as well as the current number of recipient clients downloading data objects from a particular provider server.

Search Engine

The search engine receives search requests 36 from recipient clients, executes the search requests, and constructs search responses. The search responses are transmitted back to the recipient clients.

In another embodiment, the search engine also receives search requests from search engine gateways, that are simply relaying the search requests from recipient clients.

In the preferred embodiment, a Search request contains: a partial data object name, an optional minimum data object quality rating, an optional minimum provider server connection bandwidth, and an optional maximum number of data object descriptions to be retrieved.

Each search response contains a list of data object descriptions as well as a list of server descriptions. In the preferred embodiment, a subset of the fields in the data object descriptions and server descriptions are returned in the search response, including: a provider server name and Internet Protocol (IP) Address, a provider server bandwidth description (56 k modem, DSL, T1, etc), a data object name (in the audio embodiment, the song title and artist name), a data object fingerprint, a data object size (in bytes), and a data object quality rating.

To execute the search, the search engine uses the fields in the search request to scan the records stored in the search engine index. If a particular data object description is marked as "Not Available" it is ignored by the search engine.

In one embodiment, the search engine gateway and the search engine exist in the same process. In another embodiment, the search engine gateway and the search engine exist on different processes, but run on the same machine. Many configurations of machines, search engine gateways, and search engines are possible.

Search Engine Index

In a preferred embodiment, the search engine index has two internal tables. These tables include a data object description table and a provider server description table. These tables are managed by the search engine index builder.

The provider server description table contains a collection of provider server descriptions 34. Some of these fields are uploaded by the provider servers during the initial connection to the search engine gateway. Others are calculated as events occur. In the preferred embodiment, entries in this table contain the following fields:

server name & IP Address password connection bandwidth (T1, 56 k modem, DSL, etc)

must push data objects to recipient client?

list of data object descriptions for this server remaining available connections allowed by Provider server site reliability (% of successful transfers)

The data object description table contains a collection of data object descriptions 22. These are uploaded by the provider server 12. As data objects are added, new data object descriptions are uploaded. As data objects are removed, existing data object descriptions are removed or optionally marked for removal. In a preferred embodiment, entries in this table contain the following fields:

filename metadata (in the audio embodiment, song name, artist name, song description)

the data object fingerprint size (in bytes)

quality rating (in the audio embodiment, the encoding bit rate and sampling frequency)

a link to the Provider server Description record

Execution Processes

Five different execution processes are serviced by the system: data object added, data object removed, search request, provider server connect, provider server disconnect.

Data Object Added

Figure 3:
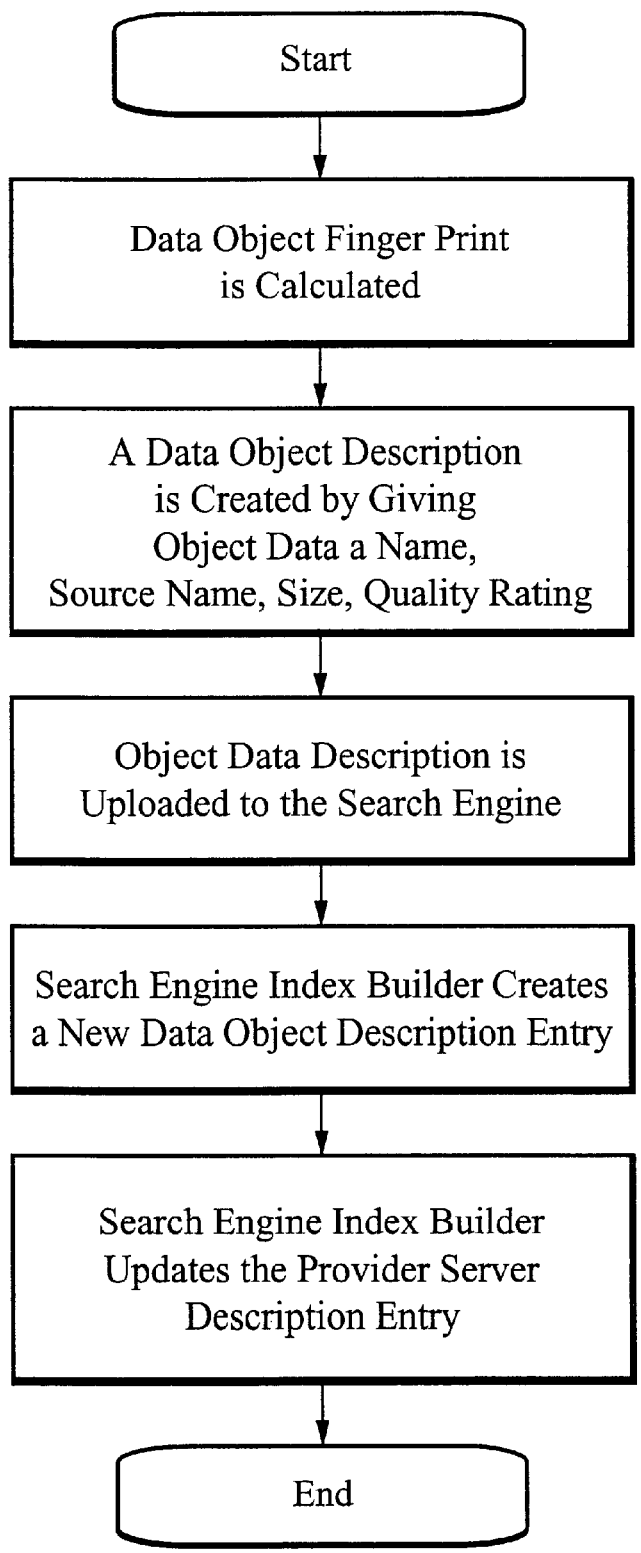
FIG. 3 is a flow chart of an embodiment of the process when a new data object is downloaded form the Internet, or otherwise added to the provider server during the initial scan of the data object collection during the log-in process.

In an embodiment as shown in FIG. 3, when a new data object is created on a provider server, when a new data object is downloaded from the Internet, or during the initial scan of the data object collection during the log-in process, the following processes occur:

a) the data object fingerprint is calculated, b) the data object is given a name, a source name, size, and a quality rating, forming an data object description, c) the data object description is uploaded to the search engine Gateway, and passed to the search engine index builder, d) The search engine index builder creates a new data object description entry in the search engine index, and e) the search engine Index Builder updates the Provider server Description entry for this server to reflect the new data object description Entry.

Data Object Removed

In an embodiment, when an existing data object is removed, the following occurs:

a) the data object fingerprint is retrieved, b) the data object fingerprint is transmitted to the search engine gateway, and passed to the search engine index builder, c) the search engine index builder removes the data object description entry for that provider server, and d) the search engine index builder updates the provider server description entry for that provider server to reflect the removal of the data object description.

Search Request

Figure 4:
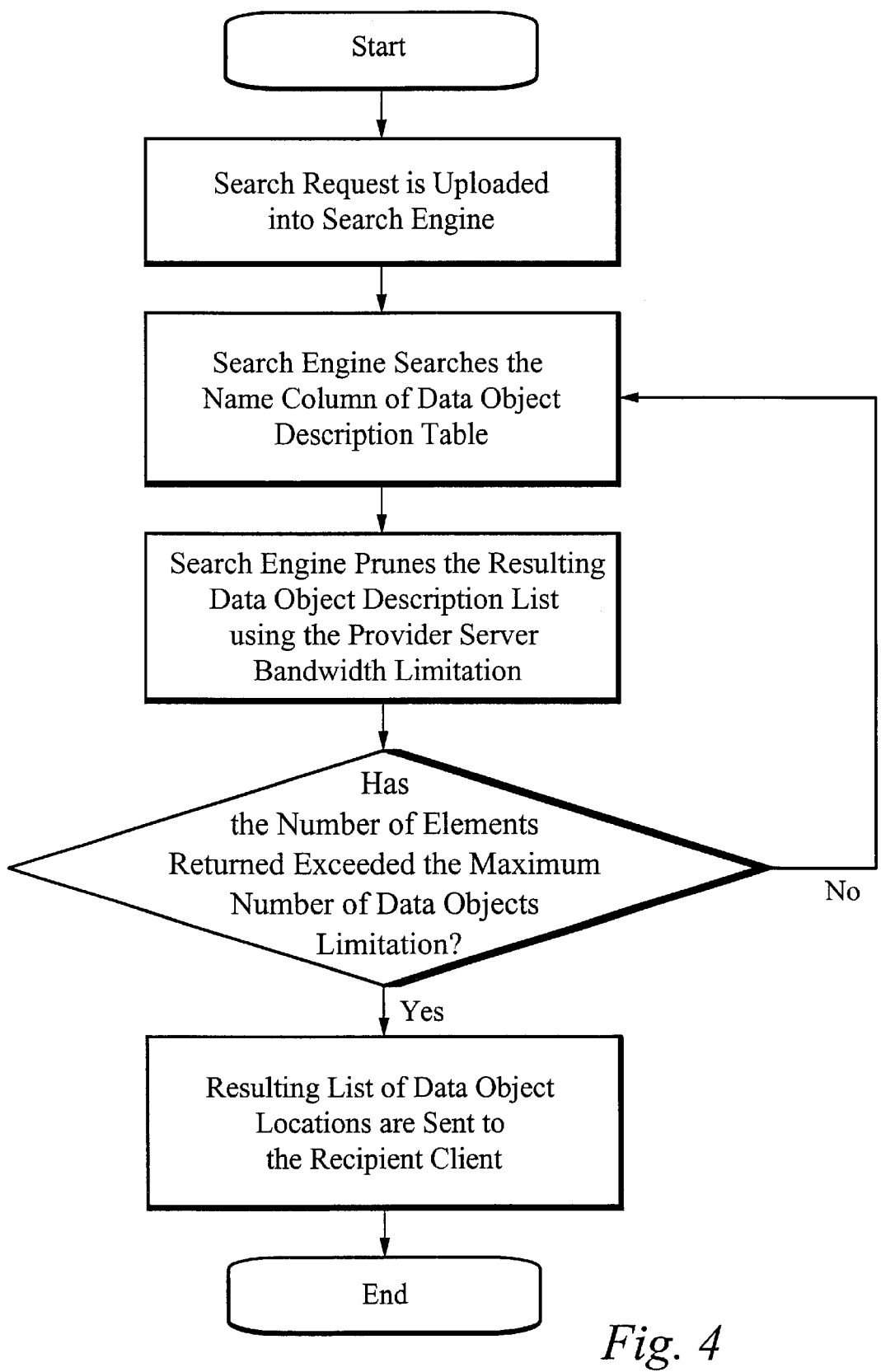
FIG. 4 is a flow chart of an embodiment of a search request constructed by a recipient client.

In an embodiment as shown in FIG. 4, when a search request is constructed by a recipient client 16, the following occurs:

a) the search request is uploaded to the search engine, b) the search engine searches the name column of the data object description table for all matches on the data object name, c) the search engine prunes the resulting data object description list using the provider server bandwidth limitation and the minimum quality rating limitation, d) if at any time the number of data object descriptions returned exceeds the maximum number of data object descriptions limitation, the search terminates and no further data object descriptions are retrieved, and e) the resulting list of data object descriptions and related server descriptions are sent to the recipient client.

Provider Server Connect

In an embodiment, when a provider server first connects to the real-time search engine, the following occurs:

a) a provider server description record is created for the provider server, b) data object descriptions for all data objects in the provider server's data object collection are uploaded to the search engine gateway, and passed to the search engine index builder, and c) the search engine index builder treats each uploaded data object description as a data object added process.

Provider Server Disconnect

In an embodiment, when an provider server disconnects from the real-time search engine, the following occurs:

a) the search engine index builder removes all data object descriptions referring to this Provider server as in the data object removed process, and b) the search engine index builder deletes or optionally marks for deletion the provider server description record.

Alternate Embodiments

In one embodiment, the data objects are audio files, and the data object descriptions comprise the filename, the bit rate, sampling frequency, and size obtained from the audio file itself. In this embodiment, preferably the recipient client 16 also incorporates an audio player, for playing the audio file. Also, the provider server contains a mechanism for constructing an audio file from a CD or other audio media source, that deposit newly-created audio files into the data object collection.

In another embodiment, the data objects are image and video files, and the data object descriptions include the filename, the compression detail and other information obtained from the jpg file itself, as well as a short description of the image. In this embodiment, preferably the recipient client 16 application also incorporates a means for displaying the image or video file, and the provider server incorporates a means for generating an image or video file from a photo or other visual image source.

In yet another embodiment, the data objects may be text, audio, image, and video data objects. Example formats include HTML text, MP3 audio, JPEG still image, and MPEG video data. Each different type of data object is also then distinguishable by type, as well as by name, and the other attributes mentioned previously.

As new image sources, and image compression and storage mechanisms become available, data object generation methods for these protocols and storage formats can be added to the recipient client and provider server without deviating from the spirit of this invention.

What is claimed is:

1. A method of updating a search-engine index serving a plurality of servers, the method comprising the steps of:
    a. establishing a communication link between a search engine and a first server;
    b. logging onto the search engine from the first server, wherein the step of logging onto the search engine comprises the steps:
        i. uploading a first data object description of a first data object from the first server to a data-object-description table within the search-engine index;
        ii. uploading a first server description from the first server to a server-description table within the search-engine index; and
        iii. relating the first server description to the first data object description within the search-engine index.

2. The method according to claim 1 further comprising the steps of:
    a. communicating a request from the first server to the search engine for a second data object defined according to a second data object description;
    b. downloading the second data object from a second server to the first server; and
    c. notifying the search engine that the step of downloading is complete.

3. The method according to claim 1 further comprising the steps of:
    a. removing a targeted data object from a specified file within the first server; and
    b. notifying the search engine that the targeted data object has been removed from the specified file within the first server.

4. The method according to claim 1 further comprising the steps of:
    a. sending a periodic message between the first server and the search engine; and
    b. determining that the first server has disconnected from the search engine if no message from the first server is received by the search engine within a predetermined timeout period.

5. The method according to claim 4 further comprising the step of removing the first server description from the search engine index.

6. The method according to claim 4 further comprising the step of flagging the first server description within the search engine index as inactive.

7. The method according to claim 5 further comprising the step of removing select data object descriptions from the search engine index.

8. The method according to claim 1 wherein the first server description comprises an IP address for accessing the first server over the internet.

9. The method according to claim 8 further comprising the step of selecting a second server from among a set of potential provider servers prior to the step of downloading a new data object from the second server, wherein the step of selecting the second server is based upon a comparison of selection parameters respectively associated with each provider server among the set of potential provider servers.

10. The method according to claim 9 wherein the selection parameters are selected from a group consisting of roundtrip response time between the first server and a potential provider server, internet connection line speed (bandwidth) of a potential provider server, a reliability of a potential provider server, a number of requests already queued to a potential provider server, and a size of a file requested for downloading.

11. The method according to claim 2 further comprising the step of uploading a requested data object from the first server to a third server.

12. The method according to claim 11 in a digital time-multiplexed environment, such that the step of uploading a requested data file from the first server to the third server is performed substantially simultaneously with the step of downloading the second data object description from the second server to the first server.

13. A method of updating a search-engine index serving a plurality of servers, the method comprising the steps of:
    a. establishing a communication link between a search engine and a first server;
    b. uploading a first server description from the first server to a server-description table within the search-engine index;
    c. communicating a request from the first server to the search engine for a data object defined according to a first data object description;
    d. downloading the first data object from a second server to the first server; and
    e. notifying the search engine that the download is complete.

14. The method according to claim 13 further comprising the steps of:
    a. removing a targeted data object from a specified file within the first server; and
    b. notifying the search engine that the targeted data object has been removed from the specified file within the first server.

15. The method according to claim 13 further comprising the steps of:
    a. sending a periodic message between the first server and the search engine;
    b. determining that the first server has disconnected from the search engine if no message from the first server is received by the search engine within a predetermined timeout period.

16. The method according to claim 15 further comprising the step of removing the first server description from the search engine index.

17. The method according to claim 15 further comprising the step of flagging the first server description within the search engine index as inactive.

18. The method according to claim 16 further comprising the step of removing select data object descriptions from the search engine index.

19. The method according to claim 13 wherein the first server description comprises an IP address for accessing the first server over the internet.

20. The method according to claim 13 further comprising the step of selecting the second server from among a set of potential provider servers prior to the step of downloading the first data object from the second server, wherein the step of selecting the second server is based upon a comparison of selection parameters respectively associated with each provider server among the set of potential provider servers.

21. The method according to claim 20 wherein the selection parameters are selected from a group consisting of roundtrip response time between the first server and a potential provider server, internet connection line speed (bandwidth) of a potential provider server, a reliability of a potential provider server, a number of requests already queued to a potential provider server, and a size of a file requested for downloading.

22. The method according to claim 13 further comprising the step of uploading a requested data object from the first server to a third server.

23. The method according to claim 22 in a digital time-multiplexed environment, such that the step of uploading a requested data file from the first server to the third server is performed substantially simultaneously with the step of downloading the first data object description from the second server to the first server.

* * * * *